United States Patent [19]

Fleming

[11] Patent Number: 5,183,116
[45] Date of Patent: Feb. 2, 1993

[54] VARIABLE PRESSURE REGULATOR FOR EXTENDED FIRE-EXTINGUISHING SYSTEM

[75] Inventor: William T. Fleming, Raleigh, N.C.
[73] Assignee: Walter Kidde Aerospace, Inc., Wilson, N.C.
[21] Appl. No.: 728,358
[22] Filed: Jul. 11, 1991
[51] Int. Cl.[5] .............................................. A62C 3/08
[52] U.S. Cl. ....................... 169/43; 137/501; 137/505.25; 169/5; 169/19; 169/62; 244/129.2
[58] Field of Search ............... 137/501, 505.25; 169/5, 169/9, 11, 19, 43, 46, 54, 56, 58, 60, 61, 62; 244/129.2

[56] References Cited

U.S. PATENT DOCUMENTS

4,643,260 2/1987 Miller ............................. 169/62 X
5,038,867 8/1991 Hindrichs et al. .................... 169/62

Primary Examiner—Johnny D. Cherry
Assistant Examiner—Andrew C. Pike
Attorney, Agent, or Firm—Rhodes, Coats & Bennett

[57] ABSTRACT

An extended fire-extinguishing discharge system discharges a fire-extinguishing material at a predetermined mass flow rate. The extended discharge system includes an extended discharge container filled with a fire-extinguishing material, at least one discharge nozzle connected with the extended discharge container for discharging the fire-extinguishing material into a protected space, and a variable pressure controller interconnected between the container and the discharge nozzle. The fire extinguishing material flows through the variable pressure controller which produces a regulated pressure as a function of the inlet pressure to the variable pressure controller. By varying the regulated pressure, the extended discharge system of the present invention is able to maintain a mass flow rate within a predetermined optimum range at any temperature of the fire-extinguishing material.

17 Claims, 7 Drawing Sheets

VARIABLE PRESSURE REGULATOR FOR EXTENDED FIRE-EXTINGUISHING SYSTEM

BACKGROUND OF THE INVENTION

In general, the cargo space in commercial aircraft is inaccessible during flight. For this reason, most commercial aircraft rely on automatic fire-extinguishing systems to extinguish any fire which occurs in the cargo space and to keep the fire suppressed for the duration of the flight.

The original approach to protecting the cargo space was to have two or more agent containers, each having sufficient agent to produce a concentration greatly in excess of that required for extinguishing a fire in the cargo space. These containers, which were rapid discharge containers, would be discharged sequentially at predetermined time intervals. For example, the first container would be discharged at the onset of a fire to raise the concentration of fire-extinguishing material in the cargo space to about 8%-10%. This concentration would decay due to leakage of fire-extinguishing material from the cargo space. Before the concentration dropped below the critical value needed t keep the fire suppressed, a second container would be fired, again producing a concentration of 8%-10%. This method of keeping a fire suppressed proved inefficient in that it requires more fire-extinguishing material than is necessary to keep the fire suppressed.

Today, most fire extinguishing systems include at least two containers —one for rapid discharge of the fire extinguishing material and one for extended discharge of the fire extinguishing material. Both containers are normally disposed outside the cargo space and are subject to temperatures between $-65°$ F. and $170°$ F. The rapid discharge container is designed to rapidly release the fire-extinguishing material so as to obtain, in a short time period, a concentration in the cargo space sufficient to extinguish or "knock-down" the fire. Because the fire-extinguishing material will gradually leak from the cargo space, the extended discharge container is designed to release the fire-extinguishing material at a much slower rate in order to keep the concentration of fire-extinguishing material in the cargo space at a predetermined value to prevent the fire from reoccurring. Without the extended discharge, the concentration of fire-extinguishing material in the cargo space could drop below what is necessary to keep the fire suppressed and embers could reignite the fire.

In prior art systems, little concern is given to maintaining a predetermined mass flow rate of the fire-extinguishing material into the cargo space. For example, some extended discharge systems simply discharge the fire extinguishing material through a fixed orifice. Testing of one such system has shown that the mass flow rate of fire-extinguishing material may vary by 38% depending on the temperature of the fire-extinguishing material. Another system uses a constant pressure regulator in series with a fixed orifice. Tests of this system revealed variations in mass flow rate of more than 600%.

Variations in the mass flow rate of fire-extinguishing material in an extended discharge system is potentially hazardous. If the mass flow rate is too low to maintain an adequate concentration of fire-extinguishing material in the cargo space the fire could reoccur. Conversely, if the mass flow rate is too high, then the fire-extinguishing material could be depleted before the flight is completed. This possibility would require the extended discharge container to be grossly over-sized to provide an adequate safety margin resulting in higher costs and greater weight to be carried.

Accordingly, there is a great need for an extended discharge system which can produce a generally constant mass flow rate over a wide temperature range.

SUMMARY AND OBJECTS OF THE INVENTION

The present invention is an extended discharge system for aircraft which compensates for temperature variations to maintain the mass flow rate of fire-extinguishing material within a predetermined, optimal range at any temperature. The extended discharge system includes a container filled with a fire-extinguishing material, a discharge nozzle connected to the extended discharge container, and a variable pressure controller interconnected between the extended discharge container and the discharge nozzle. The variable pressure controller produces a variable regulated pressure which varies as a function of the inlet pressure to the controller. By varying the regulated pressure according to the present invention, the extended discharge system is able to maintain the mass flow rate of the fire-extinguishing material within the predetermined optimal rang irrespective of the temperature of the fire-extinguishing material.

The variable pressure controller uses a sliding piston to vary the size of a variable orifice between an inlet chamber and a control chamber. The inlet pressure within the inlet chamber acts on the piston tending to enlarge the variable orifice. The regulated pressure, or the pressure in the control chamber, acts on the piston tending t close the variable orifice. At higher pressures, the piston will assume a position which restricts the flow of fire-extinguishing material between the inlet chamber and the control chamber. As the pressure drops, force balance on the piston is upset causing the piston to move toward a more open position. As the size of the variable orifice increases, the pressure drop across the orifice will decrease until a new force balance is established. As the pressure continues to drop the variable orifice will open to a point that it no longer restricts the flow of fire-extinguishing material between the inlet chamber and regulated pressure chamber. Below this threshold pressure, there will be no regulation of the pressure.

Based on the foregoing, it is a primary object of the present invention to provide an extended discharge fire suppression system for aircraft which maintains a predetermined mass flow rate of fire-extinguishing material irrespective of variations in temperature of the fire extinguishing material.

Another object of the present invention is to provide an extended discharge system having a variable pressure controller which provides a variable regulated pressure as a function of the inlet pressure to the controller.

Still another object of the present invention is to provide an extended discharge system which is effective in keeping a fire aboard an aircraft suppressed for the duration of the aircraft's flight.

DETAILED DESCRIPTION OF THE INVENTION

Figure 1:
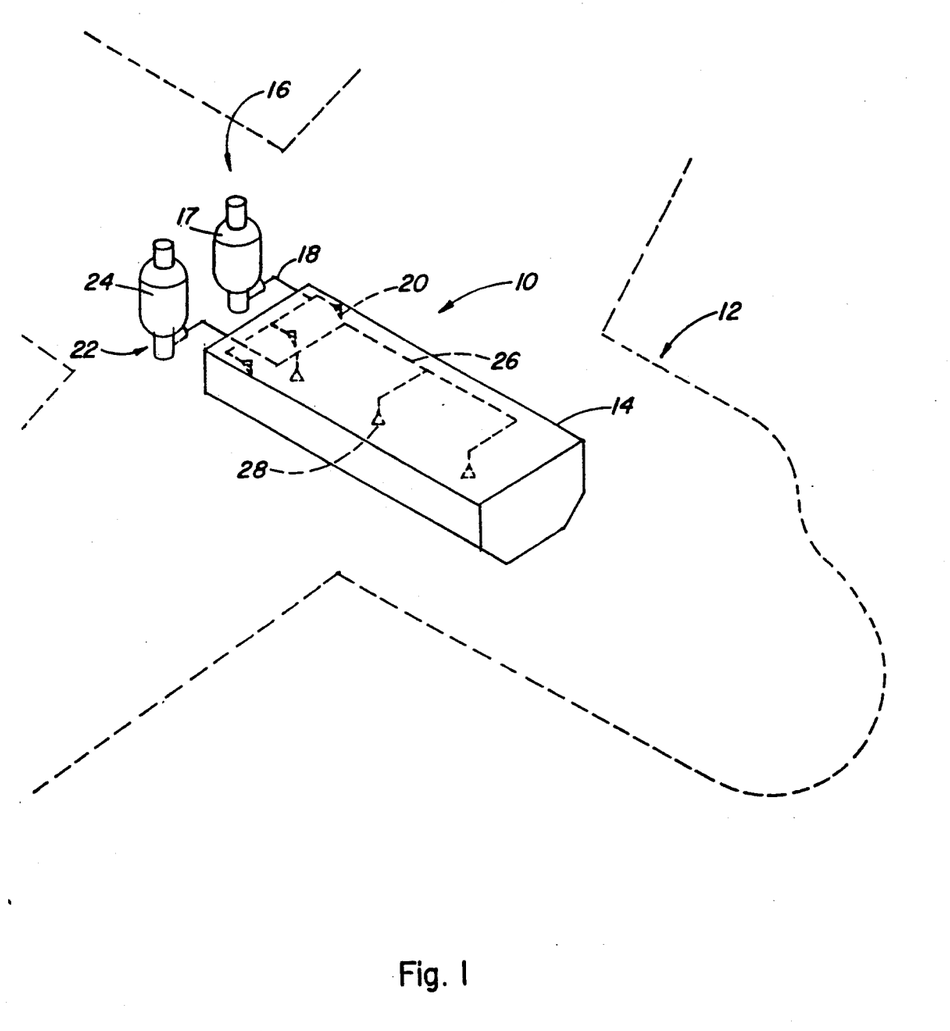
FIG. 1 is a schematic diagram of a fire-extinguishing system incorporating the extended discharge system of the present invention.

Referring now to the drawings, and particularly to FIG. 1, a typical fire-extinguishing system is shown schematically and indicated generally by the numeral 10. The fire-extinguishing system 10 is used for suppressing a fire in a cargo bay 14 of an aircraft 12. The fire-extinguishing system includes a rapid discharge system 16 and an extended discharge system 22. The rapid discharge system includes at least one container 17 connected by line 18 to discharge nozzles 20. The fire-extinguishing material from the container 17 is rapidly discharged to obtain a relatively high concentration of fire-extinguishing material sufficient to extinguish the fire.

The extended discharge system 22 includes in the cargo bay 14 at least one container 24 connected by line 26 to the extended discharge nozzles 28. The extended discharge container 24 is adapted to slowly release fire-extinguishing material to prevent the fire from reflaming. More particularly, the extended discharge container 24 releases an amount of fire-extinguishing material sufficient to compensate for any loss of concentration in the cargo bay 14 due to leakage. Thus, the concentration of fire extinguishing material within the cargo bay 14 can be maintained at a sufficient level to keep the fire suppressed.

Figure 2:
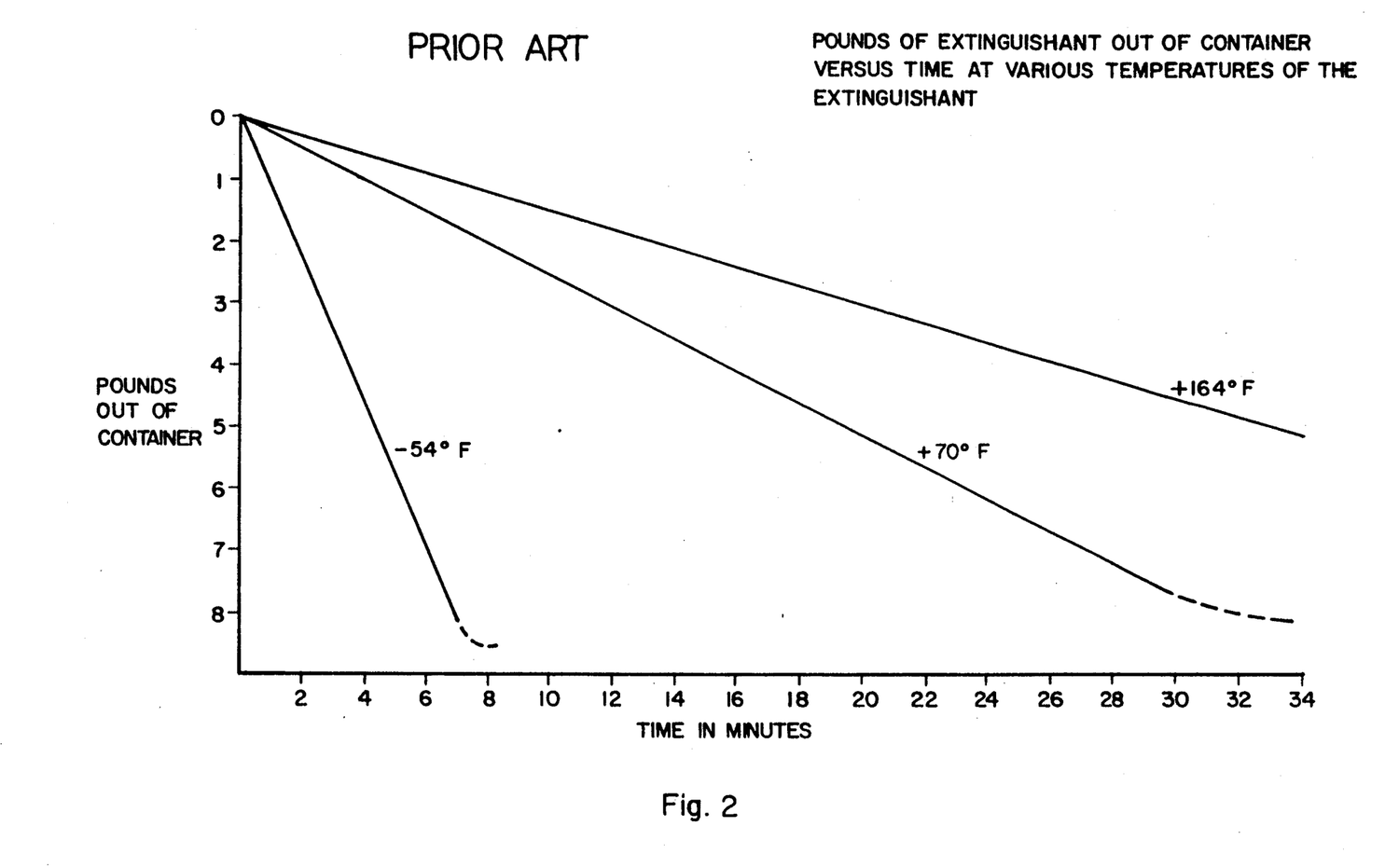
FIG. 2 is a graph illustrating the performance of a prior art extended discharge system using a constant pressure regulator in series with a fixed orifice.
Figure 3:
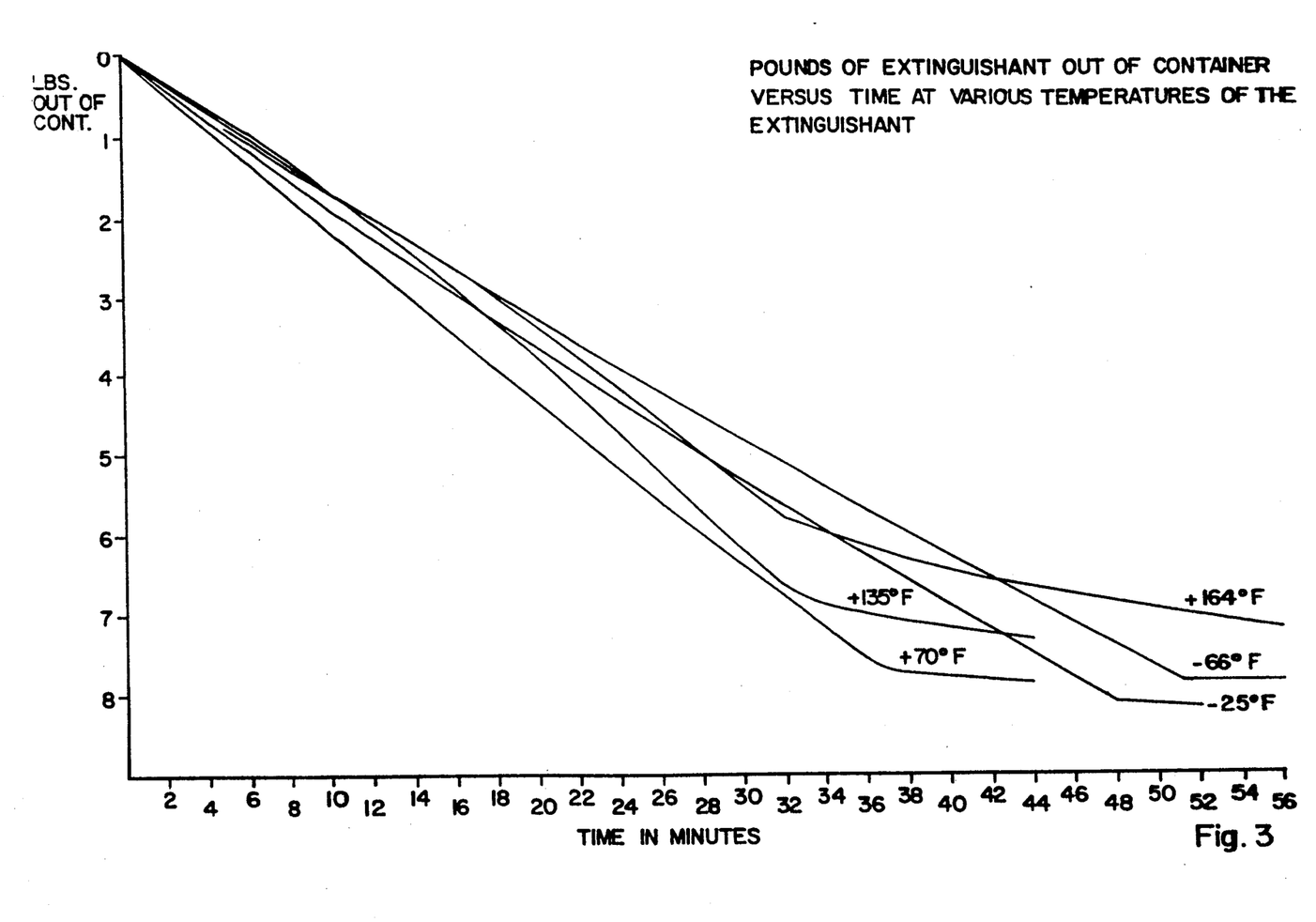
FIG. 3 is a graph illustrating the performance of a prior art extended discharge system having a fixed orifice and no pressure regulation.

In the past, the extended discharge systems have discharged the fire-extinguishing material through a fixed orifice or have used a constant pressure regulator in series with a fixed orifice. It has been discovered that the mass flow rate of fire-extinguishing material from the extended discharge container in prior art devices will vary greatly depending upon the temperature of the fire-extinguishing material. For example, the graph shown in FIG. 2 illustrates the operation of an extended discharged system with a fixed pressure regulator set at 50 lbs/in$^2$ in series with a fixed orifice. The system represented in the graph is currently in use in commercial aircraft. The graph illustrates the rate at which the fire-extinguishing material is discharged at different temperatures. The system was tested at temperatures of $-54°$ F., $70°$ F., and $164°$ F. As can be clearly seen, the mass flow rate of the fire-extinguishing material varied widely depending on the temperature. A second test was conducted in an extended discharge system with a single fixed orifice and no pressure regulation. The system was tested at temperatures of $-66°$ F., $-25°$ F., $70°$ F., $135°$ F., and $164°$ F. The results of this test are shown in FIG. 3. As can be seen in the graph, the system without any pressure regulation produced better results than the system with constant pressure regulation. Nevertheless, the extended discharge system with the single fixed orifice produced a mass flow rate which varied by approximately 40% depending on the temperature of the fire-extinguishing material.

The present invention is designed to obtain a far greater degree of consistency in the mass flow rate of fire-extinguishing material in an extended discharge system. A more consistent mass flow rate is achieved by using a variable pressure controller in series with a fixed orifice. The pressure controller produces a regulated pressure as a function of the inlet pressure to the regulator. The relationship of the inlet pressure to the regulated pressure was selected based on empirical studies conducted to produce a constant mass flow rate over a wide range of temperatures.

Figure 4:
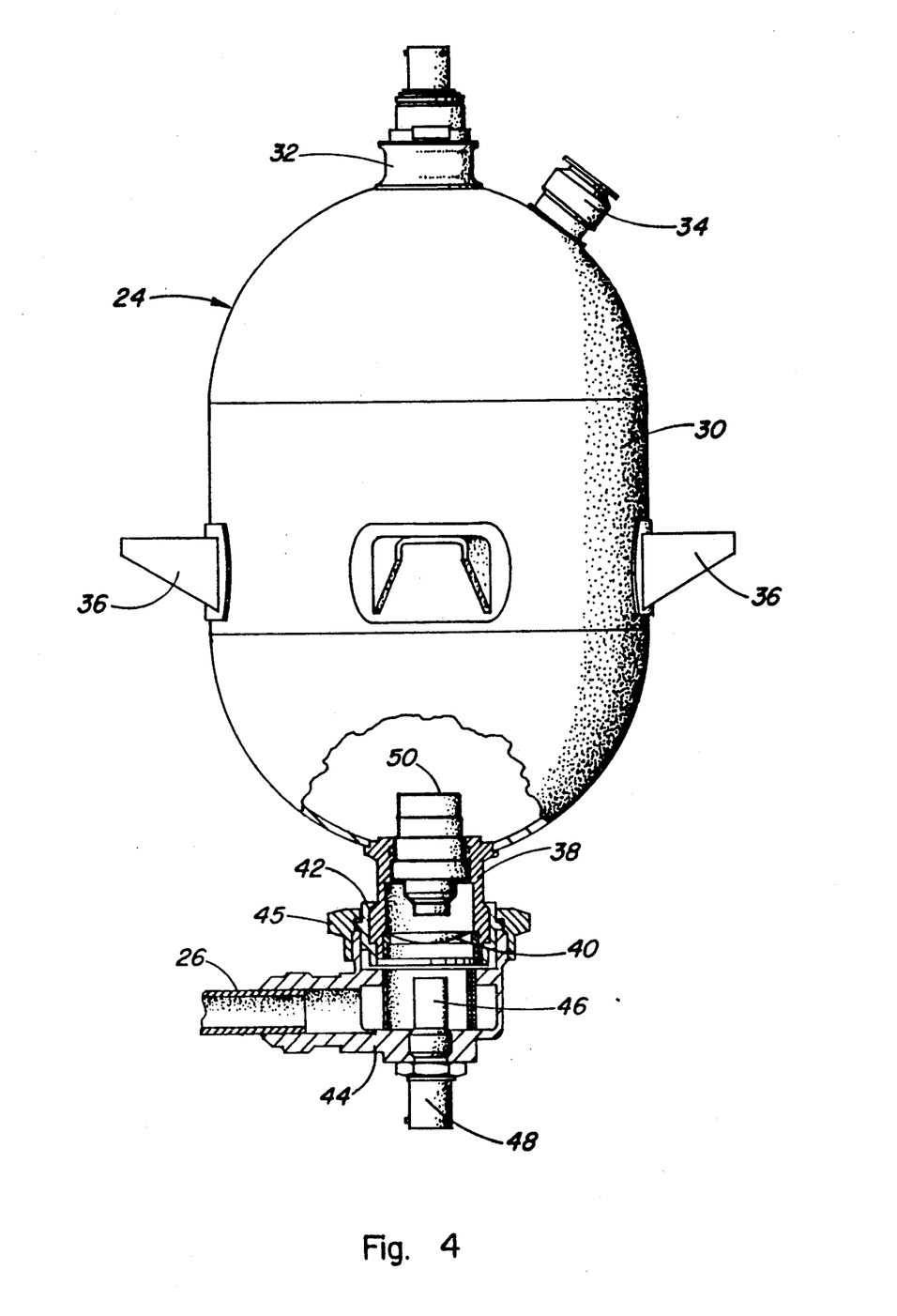
FIG. 4 is an elevation view of an extended discharge container with a portion thereof shown in section.
Figure 5:
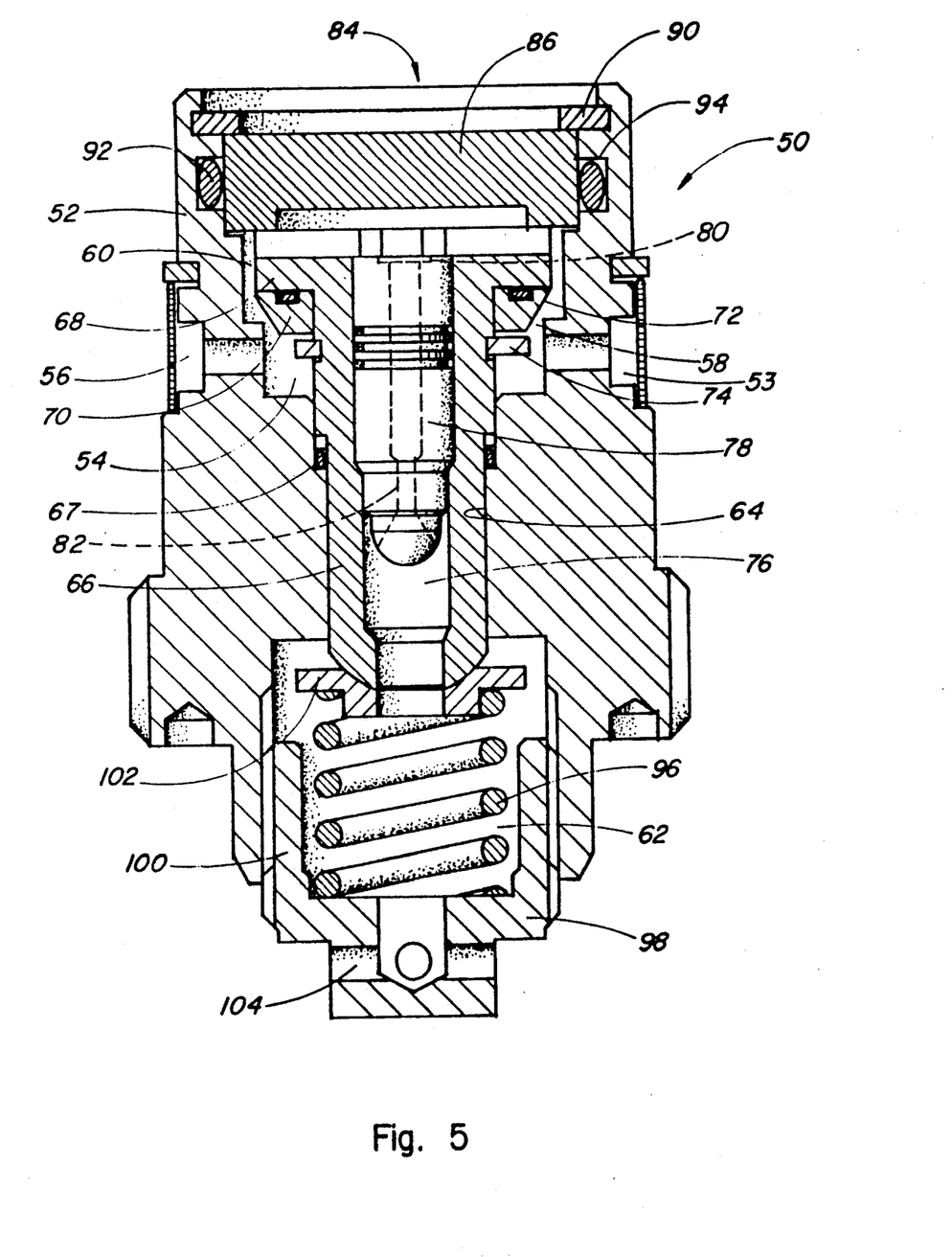
FIG. 5 is a longitudinal sectional view of the variable pressure controller used in the extended discharge system.

Referring now to FIGS. 4 and 5, the extended discharge system is shown in greater detail. The extended discharge container 24 includes a generally cylindrical tank 30. A pressure switch fitting 32 and fill fitting 34 are disposed in the upper portions of the tank 30 which is hermetically sealed around the fittings. Four mounting lugs 36 are welded to the circumference of the tank 30 for mounting the container 24 in the aircraft. An exhaust fitting 38 is disposed at the lower end of the tank 30 and the tank 30 is hermetically sealed around the fitting 38. The variable pressure controller 50 is inserted into the exhaust fitting 38 and projects into the lower regions of the tank 30. A frangible burst disk 40 is fitted inside the exhaust fitting 38 and is also hermetically sealed around its outer periphery to the inside of the exhaust fitting 38. A sleeve adapter 42 is threaded onto the outer circumference of the exhaust fitting 38. A standard discharge head 44 slides over the adapter sleeve 42 and is secured by a nut 45 which engages threads on the discharge head 44. The discharge head 44 includes a cartridge 46 which is connected to the electrical connector 48. When a fire is detected, the cartridge 46 is fired into the frangible burst disk 40 to rupture the disk 40. Once the disk 40 is ruptured, the fire-extinguishing material flows through the variable pressure controller 50 into the discharge head 44. From the discharge head 44, the fire-extinguishing material is directed through line 26 to the discharge nozzles 28 at a predetermined mass flow rate needed to maintain an adequate concentration of fire-extinguishing material in the cargo bay 14 to keep the fire suppressed.

Referring now to FIG. 5, the variable pressure controller 50 is shown in detail. The variable pressure regulator 50 includes a housing 52 having an inlet chamber 54, a control chamber 60, and an exhaust chamber 62. The control chamber 60 is larger in diameter than the inlet chamber 54 so as to define a shoulder 56. The housing 50 is open at both ends. The end adjacent the control chamber 60 is enclosed by means of a piston stop 86 which is held by a retaining ring 90. An o-ring 92 is inserted into a circumferential groove 94 formed in the housing 52 to prevent leakage of fire-extinguishing material around the piston stop 86. The opposite end is enclosed by a spring cap 98. The spring cap 98 includes an externally threaded skirt 100 which engages corresponding threads formed internally in the exhaust chamber 62 of the housing 52. The spring cap 98 also includes exhaust ports 104 through which the fire-extinguishing material exits the controller 50. A piston bore 64 extends axially through the housing 52 between the inlet chamber 54 and exhaust chamber 62. A piston 66 having an outwardly projecting flange 68 is slidably mounted in the piston bore 64 for controlling the flow of fire-extinguishing material through the controller 50. The piston 66 includes a seat member 70 made of nylon material and having a conical outer surface 72 which is held in place by a retaining ring 74. The conical surface 72 of the seat member 70, in combination with the shoulder 56, defines a variable orifice 58 communicating between the inlet chamber 54 and control chamber 60. An o-ring 67 extends around the circumference of the piston to prevent leakage of fluid around the piston 66 from the inlet chamber 54 to the exhaust chamber 62.

An internal passageway 76 is formed inside the piston 66 and communicates between the control chamber 60 and exhaust chamber 62. Fluid in the control chamber 60 passes through the piston 66 into the exhaust chamber 62. A restrictor 78 is inserted into the internal passageway 76 of the piston 66. The restrictor 78 includes a filter 80 in series with a fixed orifice 82 for metering the fire-extinguishing material flowing through the piston 66.

The piston 66 is biased against the stop 86 by a spring 96. The spring 96 is retained by the spring cap 98. One end of the spring 96 is inserted into the skirt 100. The opposite end of the spring 96 pushes against a spring plate 102 which engages the end of the piston 66 to bias the piston 66 toward a less restrictive position.

In operation, pressurized fire-extinguishing material enters the inlet section 54 through the inlet 53. A screen is provided over the inlet 53 to prevent particulate matter from entering the controller 50. These fluids ar forced through the variable orifice 58 between the shoulder 56 and the conical surface 72 of the seat member 70 into the control chamber 60. A reduction in pressure is effected by restriction of the flow of fire-extinguishing material through the variable orifice 58. From the drawings, it will be appreciated that the inlet pressure $P_i$ within the inlet chamber 54 will produce a force which acts against the piston tending to force the piston 66 to a more open position. The regulated pressure $P_R$ inside the control chamber 60 acts on the piston 66 tending to force the piston 66 to a more restricted position. The effective area $A_1$ of the piston 66 acted on by the inlet pressure $P_i$ is less than the effective area $A_2$ of the piston 66 acted on by the regulated pressure $P_R$. The ratio of these areas $A_1$ and $A_2$ plus the force of the spring 96 is such that the net force exerted on the piston 66 by the regulated pressure $P_R$ will always exceed the net force exerted on the piston 66 by the inlet pressure.

The pressure controller 50 will always try to maintain a force balance according to the following equation:

$$PA_2 = P_i A_1 + K$$

where K equals the force exerted by the spring on the piston.

If the temperature of the fire extinguishing material in the container becomes lower, the inlet pressure $P_i$ to the controller 50 will decrease. The decrease in the inlet pressure $P_i$ will upset the force balance on the piston 66 causing the piston 66 to move towards a more open position. As the area of the variable orifice 58 increases, there will be less restriction on the flow of fluid between the inlet chamber 54 and control chamber 60 so that the pressure differential will also decrease. When a predetermined threshold pressure is reached, the difference between the force exerted by the regulated pressure on the piston 66 and the force exerted by the inlet pressure on the piston 66 will be insufficient to counterbalance the spring force. Thus, the piston 66 will be urged to an extreme open position as shown in FIG. 5. At this extreme open position, the cross-sectional area of the variable orifice 58 will not restrict flow between the inlet chamber 54 and the control chamber 60 so there is no pressure differential. Thus, for all values below this threshold pressure, the controller 50 will not regulate the pressure. This threshold pressure is determined by the spring force exerted on the piston 66 and can be changed by either tightening or loosening the spring cap 98.

If the temperature of the fire-extinguishing material in the container becomes higher, the inlet pressure $P_i$ to the controller 50 will increase. The increase in the inlet pressure $P_i$ will upset the force balance on the piston 66 causing the piston 66 to move towards a more restrictive position. As the area of the variable orifice 58 decreases, there will be more restriction on the flow of fluid between the inlet chamber 54 and control chamber 60 so that the pressure differential will also increase.

In this manner, the pressure controller 50 of the present invention compensates for pressure and density variation resulting from changes in the temperature of the fire-extinguishing material over the operational range of the controller. As a result, the mass flow rate of fire-extinguishing material at $-65°$ F. will be roughly equal to the mass flow rate of fire-extinguishing material at $160°$ F.

Figure 6:
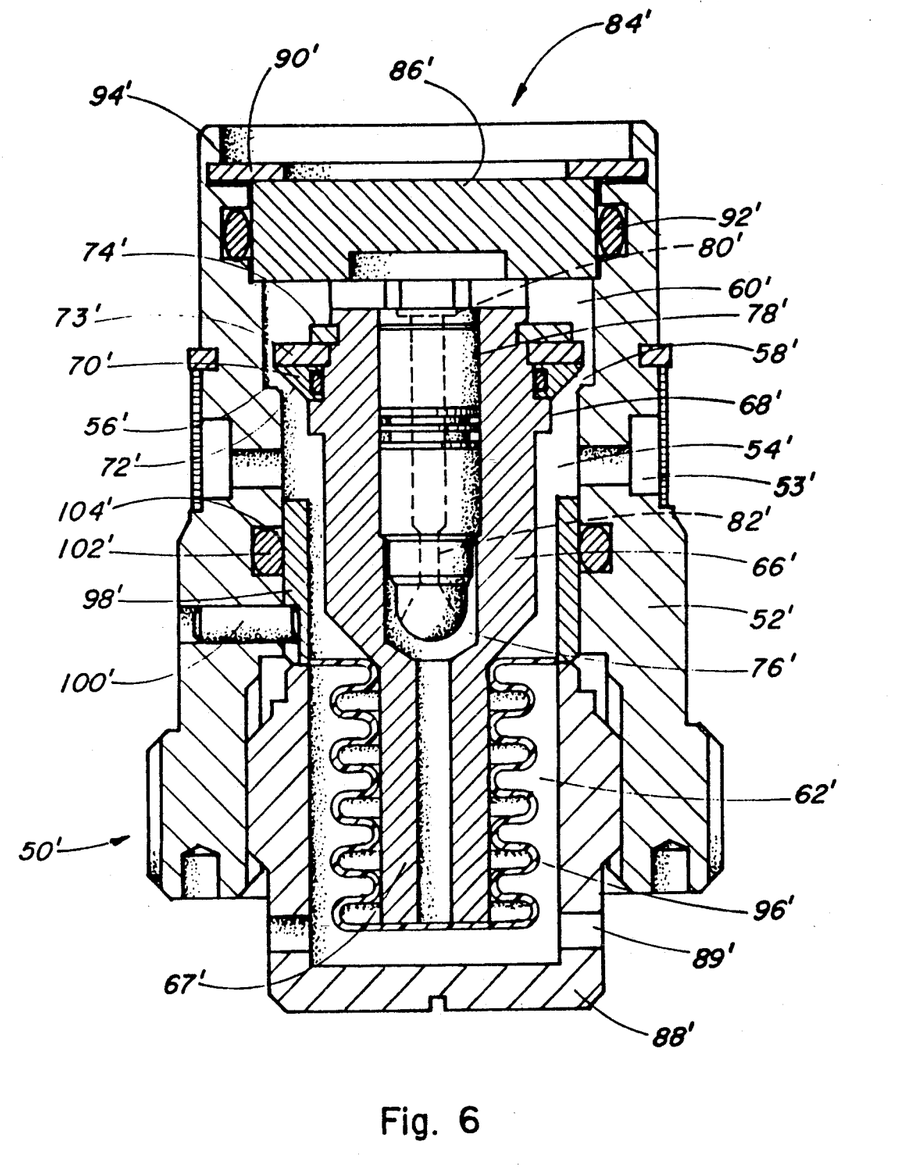
FIG. 6 is a longitudinal sectional view of a second embodiment of the variable pressure controller used in the extended discharge system.

Referring now to FIG. 6, an alternate embodiment of the variable pressure controller is shown and indicated generally at 50'. The variable pressure regulator 50' includes a housing 52' having an inlet chamber 54', a control chamber 60', and an exhaust chamber 62'. The control chamber 60' is larger in diameter than the inlet chamber 54' so as to define a shoulder 56'. The housing 52' is open at both ends. The end adjacent the control chamber 60' is enclosed by means of a piston stop 86' which is held by a retaining ring 90'. An o-ring 92' is inserted into a circumferential groove 94' formed in the housing 52' to prevent leakage of fire-extinguishing material around the piston stop 86'. The opposite end is enclosed by an end cap 88'. The end cap 88' is externally threaded and engages corresponding threads formed internally in the exhaust chamber 62' of the housing 52'. The end cap 88' includes exhaust ports 89' through which the fire-extinguishing material exits the controller 50'.

A piston 66' is movably mounted in the housing 52'. The piston 66' includes a removable seat 70' disposed around the main body chamber 68' of the piston 66' which is held in place by a washer 73' and retaining ring 74'. The seat 70' includes a conical surface 72' which is disposed with respect to the shoulder 56' of the housing 52' so as to define a variable size orifice 58'.

An internal passageway 76' is formed in the piston 66' which communicates between the control chambers 60' and exhaust chamber 62'. A restrictor 78' is disposed in the internal passageway 76' of the piston 66'. The restrictor 78' includes a filter 80' in series with a fixed orifice 82' for metering the fire-extinguishing material flowing through the piston 66'.

The piston 66' is biased against the stop 86' by a bellows 96'. The bellows 96' is secured at one end to a bellows stop 98' which is secured in the housing 52' by a roll pin 100'. Leakage of gas around the bellows stop 98' is prevented by an o-ring 102' which is disposed in a circumferential groove 104' formed in the housing 52'. The neck 67' of the piston extends into the bellows 96' which keeps the piston 66' centered in the housing 52'. The bellows 96' also functions to keep fluid from flowing between the inlet chamber 54' and the exhaust chamber 62'.

The embodiment shown in FIG. 6 functions in the same manner as the previous embodiment. The fire-extinguishing material enters the inlet chamber 54' through the inlet 53'. Fluid must then pass through the variable orifice 58' into the control chamber 60'. As long as the pressure in the inlet chamber 54' remains above the pre-determined threshold pressure, the flow of fluid will be restricted as the fluid passes through the variable orifice 58' resulting in a pressure differential between the fluid in the inlet chamber 54' and the fluid in the control chamber 60'. As the pressure drops, the force balance on the piston 66' is upset causing the piston 66' to move toward a less restricted position. As a result, the pressure differential between the inlet chamber 54' and the control chamber 60' will decrease. As the pressure continues to drop, the variable orifice 58' will open to a point that it no longer restricts the flow of fire-extinguishing material between the inlet chamber 54' and the control chamber 60'. Below this threshold pressure, there will be no regulation of the pressure.

Figure 7:
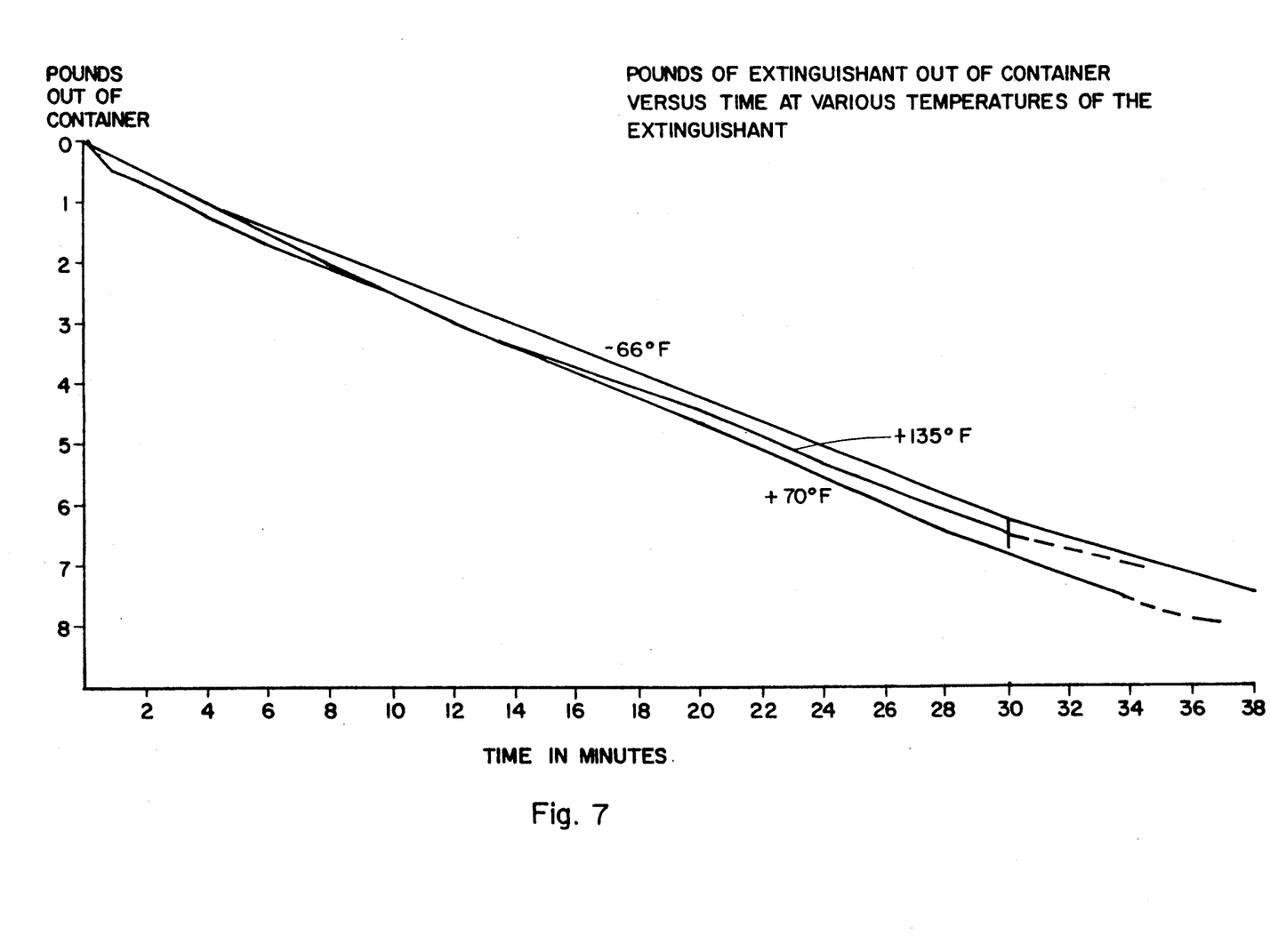
FIG. 7 is a graph illustrating the performance of the extended discharge system of the present invention.

It has been found that the variable pressure regulator according to the present invention when used in a extended discharged system produces a mass flow rate which remains relatively constant over a wide range of temperatures. A prototype of the system was tested and the results of the test are shown in FIG. 7. As the figure clearly illustrates, the extended discharge system of the present invention produced a more consistent flow rate over a wide range of temperatures than the prior art extended discharge systems. With the present invention, variations in flow rate between temperatures of −70° to 160° can be kept within ±5% of a predetermined mass flow rate needed to keep the fire within a cargo space of an airplane suppressed.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An extended discharge system for discharging a fire-extinguishing material at a generally constant predetermined mass flow rate comprising:
   (a) a container filled with the fire-extinguishing material;
   (b) a discharge nozzle connected with the container for discharging the fire-extinguishing material into a protected space; and
   (c) pressure regulating means for varying a pressure of the fire-extinguishing material passing from the container to the discharge nozzle as a function of an inlet pressure to the regulating means so as to produce a variable regulated pressure and the generally constant, predetermined mass flow rate of the fire-extinguishing material from the discharge nozzle irrespective of a temperature of the fire-extinguishing material.

2. The extended discharge system according to claim 1 wherein the pressure regulating means included a housing having a pressure inlet chamber, a regulated pressure chamber, a variable orifice defined between the pressure inlet chamber and the regulated pressure chamber for restricting a flow of the fire-extinguishing material between the chambers for causing a pressure drop across the orifice, and means for varying a size of the orifice which results in varying the pressure drop thereacross.

3. The extended discharge system according to claim 2 wherein the means for varying the size of the orifice includes a piston reciprocally mounted in the housing.

4. The extended discharge system according to claim 1 wherein the pressure regulating means includes means for establishing a positive threshold pressure where the inlet pressure equals the regulated pressure and wherein the pressure regulating means maintains the regulated pressure equal to the inlet pressure at pressures below the threshold pressure.

5. The extended discharge system according to claim 4 wherein as the fire-extinguishing material passes from the container to the pressure regulating means the inlet pressure continues to decrease from an initial inlet pressure to the threshold pressure, and wherein the pressure regulating means further includes means for maintaining the regulated pressure at a pressure below the inlet pressure as the inlet pressure decreases from the initial inlet pressure to the threshold pressure but wherein a difference between the regulated pressure and the inlet pressure progressively decreases as the inlet pressure approaches the threshold pressure.

6. The system according to claim 1 wherein the pressure regulating means includes:
   (a) a housing having a pressure chamber, an inlet chamber, and a regulated pressure chamber wherein the inlet chamber is communicatively connected to the container for receiving the fire-extinguishing material therefrom;
   (b) a variable orifice defined between the inlet chamber and the regulated pressure chamber for generating a pressure drop across the orifice;
   (c) means for varying a size of the orifice so as to vary the pressure drop across the orifice;
   (d) biasing means associated with the means for varying the orifice size for effectively opening the orifice such that at a certain inlet pressure the orifice ceases to provide a pressure drop giving rise to a threshold pressure where the inlet pressure equals the pressure within the regulated pressure chamber and wherein the regulated pressure equals the inlet pressure for inlet pressure less than the threshold pressure; and
   (e) wherein the means for adjusting the size of the orifice functions to provide a variable pressure drop across the orifice such that as the inlet pressure decreases from an initial inlet pressure to the threshold pressure the regulated pressure is maintained below the inlet pressure and a difference in pressure between the inlet pressure and the regulated pressure progressively decreases as the inlet pressure moves towards the threshold pressure.

7. An extended discharge system for discharging a fire-extinguishing material at a generally constant predetermined mass flow rate irrespective of a temperature of the fire-extinguishing material comprising:

(a) a container filled with the fire-extinguishing material;
(b) a discharge nozzle connected with the container for discharging the fire-extinguishing material into a protected space; and
(c) pressure regulating means disposed between the container and the discharge nozzle for providing a regulated pressure and regulating a flow of the fire-extinguishing material so as to maintain the generally constant, predetermined mass flow rate, said regulating means including:
  (1) a housing having an inlet chamber, a regulated pressure chamber, and an outlet;
  (2) a variable size orifice between the inlet chamber and the regulated pressure chamber for restricting the flow of the fire-extinguishing material between the inlet chamber and the regulated pressure chamber and for producing the regulated pressure within the regulated pressure chamber which is less than an inlet chamber pressure;
  (3) a fixed orifice between the regulated pressure chamber and the outlet; and
  (4) means for varying a size of the variable orifice in response to changes in the inlet pressure of the fire-extinguishing material so that a pressure differential between the inlet pressure and the regulated pressure decreases as the inlet pressure decreases and increases as the inlet pressure increases.

8. The extended discharge system according to claim 7 wherein the means for varying the size of the variable orifice comprises a piston slidably mounted in the housing and responsive to changes in the inlet pressure and the regulated pressure for movement towards either a less restrictive position or a more restrictive position.

9. The extended discharge system according to claim 8 wherein the inlet pressure and the regulated pressure produce counterbalancing forces acting on the piston, and wherein the piston slides back and forth within the housing to balance said forces.

10. The extended discharge system according to claim 9 wherein the regulated pressure urges the piston to more restrictive position and wherein the inlet pressure urges the piston to less restrictive position.

11. The extended discharge system according to claim 8 wherein the pressure further regulating means includes means for setting a minimum threshold pressure at which the piston assumes a non-restrictive position, so that the inlet pressure and the regulated pressure remain equal below the threshold pressure.

12. The extended discharge system according to claim 11 wherein the means for setting the threshold pressure comprises a spring means for urging the piston towards a the non-restrictive position.

13. The extended discharge system according to claim 7 further including means for setting a minimum threshold pressure at which the variable size orifice opens sufficiently to no longer restrict the flow of the fire-extinguishing material from the inlet chamber to the regulated pressure chamber so that the regulated pressure will equal the inlet pressure for pressure values below the threshold pressure.

14. A method of regulating a discharge of fire-extinguishing material from a container to produce a generally constant mass flow of the fire-extinguishing material to a protected area irrespective of a temperature that the fire-extinguishing material may assume over a certain operational range, comprising the steps of:
(a) directing the fire-extinguishing material from the container through a pressure regulator and out a discharge nozzle; and
(b) maintaining the generally constant mass flow of the fire-extinguishing material from the discharge nozzle over a relatively wide range of the temperatures that the fire-extinguishing material may assume by producing a variable regulated pressure that is a function of a pressure of the fire-extinguishing material entering the pressure regulator.

15. The method of claim 14 wherein an inlet pressure of the fire-extinguishing material decreases from an initial inlet pressure as the fire-extinguishing material is discharged from the container, and wherein the method further includes providing the regulated pressure that is less than the initial inlet pressure and continuing to vary the regulated pressure as the inlet pressure decreases such that a pressure differential between the inlet pressure and the variable regulated pressure progressively decreases as the inlet pressure decreases from the initial inlet pressure.

16. The method of claim 15 further including producing a threshold pressure where the inlet pressure is generally equal to the regulated pressure and maintaining the regulated pressure generally equal to the inlet pressure at pressures equal to or less than the threshold pressure.

17. The method of claim 16 further including the step of generating the regulated pressure by directing the fire-extinguishing material through a variable orifice and varying a pressure drop across the orifice such that the pressure drop continues to decrease as the container is emptied, giving rise to the variable regulated pressure on a low pressure side of the orifice.

* * * * *